Patented Apr. 20, 1926.

1,581,663

UNITED STATES PATENT OFFICE.

HERMAN SCHREIBER, OF LANSING, MICHIGAN.

PROCESS FOR THE MANUFACTURE OF SUGAR.

No Drawing.   Application filed May 23, 1925.   Serial No. 32,484.

*To all whom it may concern:*

Be it known that I, HERMAN SCHREIBER, citizen of the United States, residing at Lansing, county of Ingham, State of Michigan, have invented certain new and useful Improvements in Processes for the Manufacture of Sugar, of which the following is a specification.

This invention relates to an improved process for the manufacture of beet sugar. It relates particularly to the treatment of the diffusion juice in the process of purification or defecation. It further relates to the improved product derived therefrom, particularly the recovery of the residue as brown sugar or molasses.

The object of the invention is the purification or defecation of the saccharine juices derived from plants such as sugar beets, sugar cane or sorghum by diffusion, extraction or expression; to prepare them better and at less expense and loss for crystallization of the sugar sucrose which they contain; and to recover in available form the molasses.

Further objects pertaining to details of the process will appear from the detailed description to follow. I accomplish the objects in the manner described in the following specification. The invention is defined and pointed out in the claims.

The way I prefer to carry on the process of my invention is to bring the juices to a suitable temperature and acidity somewhere between 0 and 80° C. and a pH of 1.5 to 7.0, and add to them the active digestive, precipitating and coagulating principles contained in commercial pepsin or rennet or like material from a great variety of animals, hogs, sheep, cattle or goats and similar enzymes are derived from plants. These may be comprehensively described and embraced in the term proteolytic enzyme.

I will describe, for example, the manufacture of beet sugar as carried on by my process. The diffusion juice of beets as prepared in the regular manufacture of sugar from beets, is heated to 52° C. or thereabout. For each ton of beets worked, I add about one-fifth to one-third ounce of U. S. P. pepsin, 1 to 2000 strength, or its equivalent in rennet. This I previously have mixed and dissolved in water, or water containing a small amount of an acid such as hydrochloric, so that the resulting mixture shall contain about .01% of HCl. The same may be directly mixed or dissolved in a small quantity of diffusion juice from the beets, then added to the batch or mass being treated.

This solution or suspension of the digesting reagents is thoroughly mixed with the diffusion juice from the beets and allowed to stand and react for from five to thirty minutes, fifteen minutes being usually sufficient. The juice at the end of this period is transferred into another tank. Then from one-fourth to one-fifth the amount of milk of lime used in other processes is added, so that about .5% CaO on beets will be in the mixture. This mixture is then heated to the usual temperature used at first carbonation, and treated with carbon dioxide gas, as is customary, to an alkalinity where the mixture will break and filter, which in common practice varies from about .05% to .15% CaO by titration with phenolphthalein as indicator as to usual temperature; the practice varies in different localities, possibly the beets grown under different condition, call for or permit variations in temperature. My process calls for no change as to temperature. By break is meant the usual condition of separation into insoluble and soluble material containing the sugar.

The mixture is filtered, the cake washed as usual, and the filtrate and washing heated to from 70° to 100° C. are again treated with carbon dioxide gas until the alkalinity falls to .01% to .05% CaO by phenolphthalein test, when it is heated to 80° to 100° C. and filtered again in the customary manner. The filtrate from this second carbonation may be sent direct to the evaporators or be subjected to a treatment with sulfurdioxide, as is customary in present practice, filtered and the filtrate evaporated to a syrup in the usual way, which syrup is either directly boiled down to a white massecuite or united with a portion of "melter" (dissolved brown sugar) and then boiled down to a white massecuite, and the white sugar is obtained, and from the residue the "high green" brown sugar and molasses are obtained.

The method of defecating or purifying such diffusion juice now in extensive use is to heat it from 70° to 95° C., add from 2% to 5% or more CaO on beets, the quantity varying with the quality of the beets, and treat with carbon dioxide to an alkalinity from .05% to .15% CaO where the mixture will break and filter, whereupon it is filtered thru presses and the cake washed, and a part of the wash water and all the filtrate are sent to another carbonation tank where the alkalinity is reduced to around .025% to .05% CaO by phenolphthalein, either with or without the addition of more milk of lime before the carbonation. The carbonated mixture is filtered, the filtrate is heated to around 100° C. and treated with sulfur dioxide gas to reduce the alkalinity to about .015% to .03% CaO, depending upon the alkalinity of the thick juice from evaporation, when it is filtered and the filtrate sent to the evaporators to be evaporated to a syrup.

What I avoid is the use of the large excess of lime and the uncertainty attendant. The present practice referred to results in the production of an inedible syrup and massecuite, and therefore an inedible brown sugar and final molasses. My process avoids the offensive odor and the product is available as human food or stock food.

I have described my invention and process as particularly applicable to the manufacture of sugar from sugar beets, where I have applied the same in detail in the manner described. The method and process is also available for use in the manufacture of sugar from sugar cane, but of course the proteids and proteins there present will be of a different character and different quality, requiring different amounts of the reagent material. In fact, in the manufacture of beet sugar it is impossible to state definite amounts of the materials to be used, because the character and quality of juice varies at any given plant during a campaign. There is a difference in quality in different portions of the same State and in different portions of the country where the crops are produced, requiring slight differences in adjustment in treatment to accomplish the result. It is not possible to state the quantity of material used in precise amount but only an indication by which the proper amounts may be used. The best method is to determine quantitatively the amount of reagent to use. This can readily be done by quantitative analysis with standard solution for any particular quality of juice being operated upon. When this is determined with accuracy, the variation for a considerable period will be so slight that no further attention need be given until it is evident there has been considerable change in the product or in conditions. Beets stored for any length of time change in their consistency and call for adjustment.

In carrying out my process I may mix or dissolve the active principles in water, in water containing a small amount of an acid such as hydrochloric, or in diffusion juice before introducing them into the bulk of the saccharine juice, or add them in dry form directly to the juice to be purified, and I may add a small amount of acid to the saccharine juice to be treated to facilitate the action, though it is not always necessary. Such addition should probably not exceed .01% acid, as hydrochloric, in the acidified juice. Many acids are recognized as equivalents.

After the reaction with the active principles has proceeded sufficiently far, I add milk of lime as above and heat to the temperature necessary for carbonation, or I may heat the juice to the proper temperature and then add the milk of lime as required.

This method of treating juices with the active principles of pepsin or rennet results in the case of diffusion juice from beets, in the production of an edible thick juice capable of producing an edible brown sugar and final molasses from beets. A larger yield of crystallized sugar is obtained than by the old method referred to. The thin juices produced show better purification.

The method and process is apparently available for the manufacture of sugar from sorghum, although this has not yet been worked out in detail. I have mentioned sugar cane and sorghum particularly, the details of which will be made the subject matter of independent patent applications.

I have described my invention in detail so as to enable those skilled in the art to apply it to the manufacture of sugar from beets.

Having thus described my invention, what I claim as new and desire to secure by Letters Patent is:

1. In the manufacture of sugar from beets, the treatment of the diffusion juice with pepsin in the presence of acid reactive with pepsin until reaction has occurred, then adding milk of lime to the treated juice, then carbonating with carbon dioxide gas until the alkalinity is reduced to such point as to obtain a break, then filtering, and continuing the treatment of the filtered juice in the usual way.

2. In the manufacture of sugar from beets, the treatment of the diffusion juice with pepsin until reaction has occurred, then adding milk of lime to the treated juice, then carbonating with carbon dioxide gas until the alkalinity is reduced to such point as to obtain a break, then filtering, and continuing the treatment of the filtered juice in the usual way.

3. In the manufacture of sugar the step which comprises the treatment of the juices with pepsin in the presence of acid reactive with pepsin until reaction has occurred.

4. In the manufacture of sugar the step which comprises the treatment of the juices with pepsin until reaction has occurred.

5. In the manufacture of sugar the step which comprises the treatment of the juices with proteolytic enzymes until reaction has occurred.

In witness whereof I have hereunto set my hand.

HERMAN SCHREIBER.